(12) United States Patent
Kosuge et al.

(10) Patent No.: US 6,568,745 B2
(45) Date of Patent: May 27, 2003

(54) AUTOMOBILE BODY STRUCTURE

(75) Inventors: Masami Kosuge, Wako (JP); Rei Sakamoto, Wako (JP); Masakazu Takahashi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/145,671

(22) Filed: May 14, 2002

(65) Prior Publication Data

US 2002/0180244 A1 Dec. 5, 2002

(30) Foreign Application Priority Data

Jun. 5, 2001 (JP) ......................................... 2001-169734

(51) Int. Cl.[7] .............................................. B62D 23/00
(52) U.S. Cl. ......................... 296/188; 296/204; 296/205
(58) Field of Search ........................... 296/205, 203.01, 296/204, 203.03, 188, 189

(56) References Cited

U.S. PATENT DOCUMENTS

| | | | | |
|---|---|---|---|---|
| 4,355,844 A | * | 10/1982 | Fantini Muzzarelli | 296/205 |
| 5,213,386 A | * | 5/1993 | Janotik et al. | 296/205 X |
| 5,354,115 A | * | 10/1994 | Esaki | 296/188 X |
| 5,435,618 A | * | 7/1995 | Sacco et al. | 296/188 |
| 5,820,204 A | * | 10/1998 | Masuda et al. | 296/188 |
| 5,954,390 A | * | 9/1999 | Kleinhoffer et al. | 296/203.01 |
| 6,129,412 A | * | 10/2000 | Tanuma | 296/204 |
| 6,267,438 B1 | * | 7/2001 | Jonsson | 296/203.03 |
| 6,273,498 B1 | * | 8/2001 | Hillman et al. | 296/203.01 |

FOREIGN PATENT DOCUMENTS

JP  6-211164  * 8/1994

* cited by examiner

Primary Examiner—Joseph D. Pape
(74) Attorney, Agent, or Firm—Merchant & Gould, P.C.

(57) ABSTRACT

An automobile body structure having a crossbeam connecting left and right center pillars. The crossbeam has a pipe-like beam body and gussets mounted to the opposite ends of the beam body. A load inputted to one of the center pillars is transmitted via the crossbeam to the other center pillar. The inputted load is dispersed through those two center pillars to prevent the center pillar from deformation having received the input load.

3 Claims, 9 Drawing Sheets

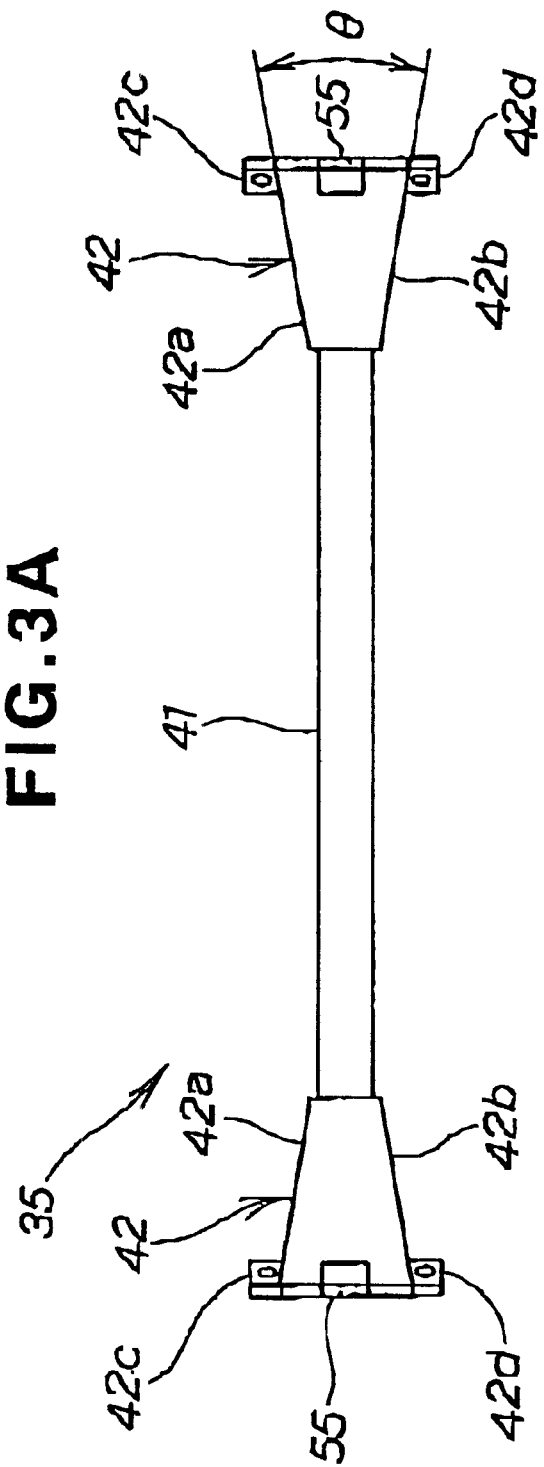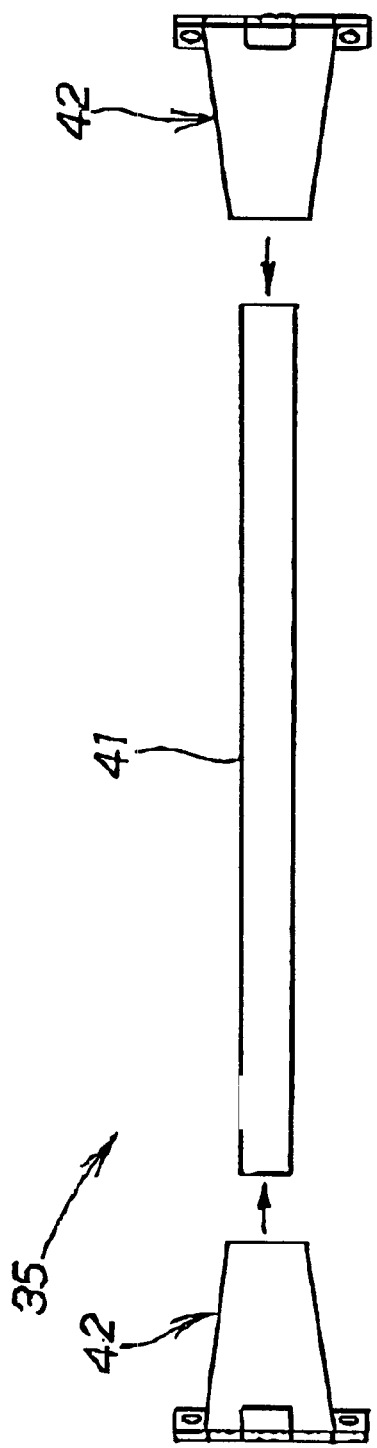
FIG.3A
FIG.3B

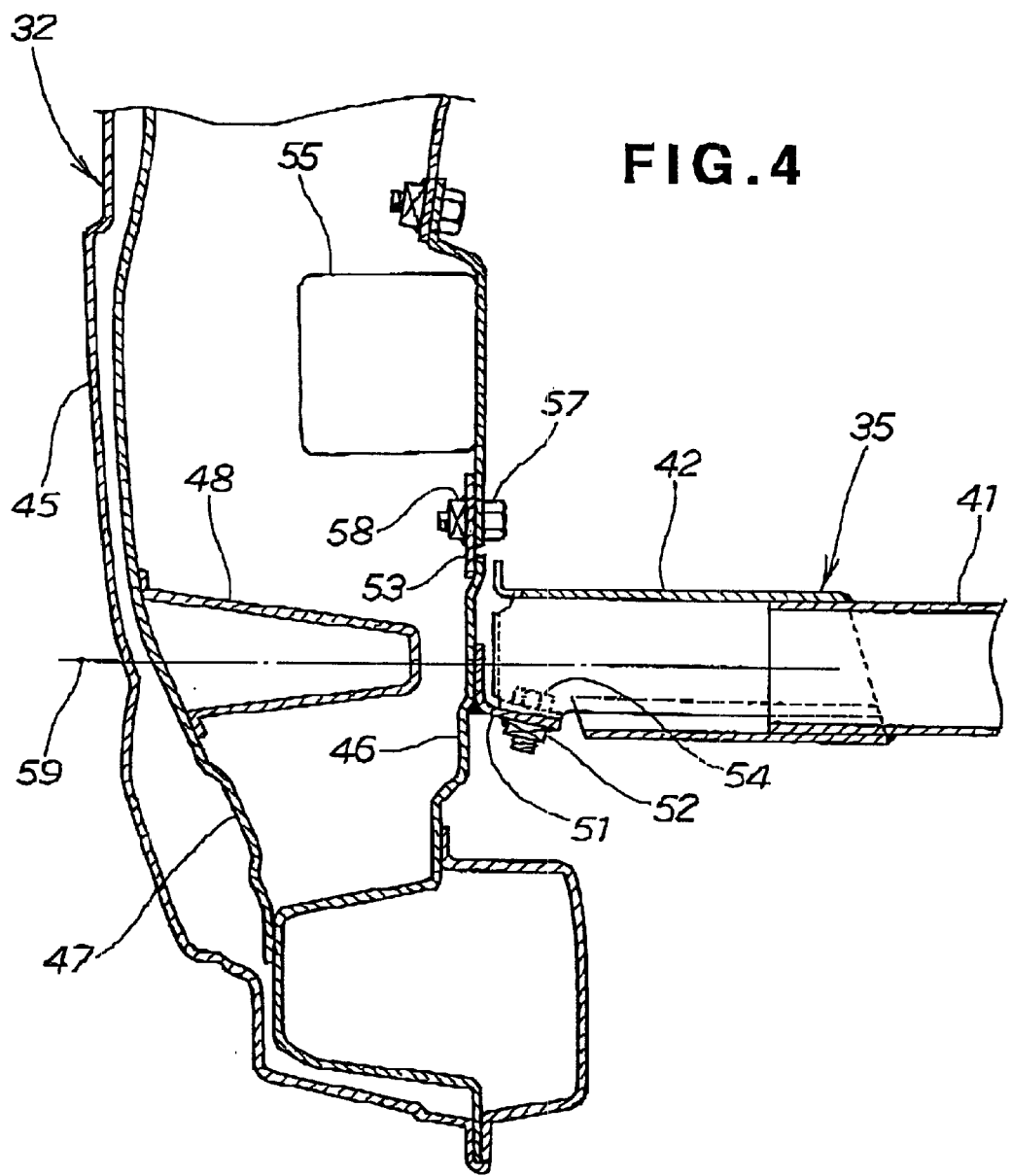

AUTOMOBILE BODY STRUCTURE

FIELD OF THE INVENTION

This invention relates to an automobile body structure which allows for reduction in manufacturing cost and weight of automobile bodies.

BACKGROUND OF THE INVENTION

FIGS. 8 and 9 hereof illustrate a conventional automobile body structure. Referring to FIGS. 8 and 9, A body 100 has left and right center pillars 101 (only the right center pillar is sown) from which opposite gussets 103 and 104 extend towards each other. Front ends of the gussets 103 and 104 are coupled to middle portions of a stiffener 106 for a floor crossmember 108 (see FIG. 9) provided on a floor panel 105. Herein, an arrow (front) indicates a forward direction of the automobile.

When another automobile strikes against the side of the above automobile, for example, the impact load applied to one of the left and right center pillars 101 is transmitted via the gusset 103 or the gusset 104 to the other center pillar 101 to be dispersed, so that the center pillar 101 having received the impact is prevented from deformation.

In order to resist the excessive load acting on the floor crossmember 108 and the stiffener 106 during the above load transmission, the stiffener 106 has a greater plate thickness or, alternatively, an additional reinforcing member 107 is mounted on the stiffener 106 between the gussets 103 and 104. The stiffener 106 is mounted on the floor crossmember 108. The reinforcing member 107 is mounted on a front upper portion of the stiffener 106. Reference numeral 111 denotes a bolster in a rear seat. The plate thicknesses of the members shown in the figure are exaggerated for purposes of illustration (this applies hereinafter).

The use of the reinforcing member 107 in the conventional automobile body structure requires a die for forming the reinforcing member 107 in a shape conforming to that of the stiffener 106, resulting in increased die cost. Further, the necessity of the greater thickness "t" of the stiffener 106 or the reinforcing member 107 increases the weight of the automobile body.

SUMMARY OF THE INVENTION

The present Invention provides an automobile body structure which allows for the reduction in manufacturing coot and weight of automobile bodies.

According to an aspect of the present invention, there is provided an automobile body structure, which comprises: a left center pillar; a right center pillar; and a crossbeam interposed between and connected to the left and right center pillars, the crossbeam comprising a beam body and gussets mounted to the opposite ends of the beam body, respectively.

When another automobile strikes against the side of the automobile, the input load inputted to one of the center pillars can be received by the other center pillar via the crossbeam. This, for example, prevents a crossmember from directly receiving the input load, eliminating the need for the reinforcement of the crossmember.

Each of the gussets has a divergent shape with the width increasing from the beam body toward the center pillar. That is, the area or the load receiving surface of the gusset to receive a load from the center pillar is increased. Thus, an input load to the center pillar is securely transmitted to the crossbeam.

Each of the center pillars of the present invention has a structure with hollow cross-section comprising an outer panel and an inner panel; and a reinforcing member for reinforcing the center pillar is interposed between the outer and inner panels and positioned on an extension line of the crossbeam so as to transmit a transverse load inputted to the center pillar to the crossbeam. An input load at a side collision is smoothly transmitted from the outer panel of one of the center pillars, through the reinforcing member, inner panel and crossbeam, to the other center pillar.

A crossmember is provided on a floor panel of the automobile body, extending between the left and right center pillars; and the beam body is fixed to the crossmember. That is, the beam body is supported on the crossmember, thereby to prevent the bending or buckling of the beam body due to an input load to the crossbeam.

BRIEF DESCRIPTION OF DRAWINGS

Preferred embodiments of the present invention will be described in detail below, by way of example only, with reference to the accompanying drawings in which:

FIGS. 3A and 3B are plan views of the crossbeam shown in FIG. 2;

FIG. 4 is an enlarged cross-sectional view taken along line 4—4 in FIG. 2, illustrating the crossbeam mounted to the right center pillar;

DETAILED DESCRIPTION OF THE PREFERRED EMBODIMENTS

Figure 1:
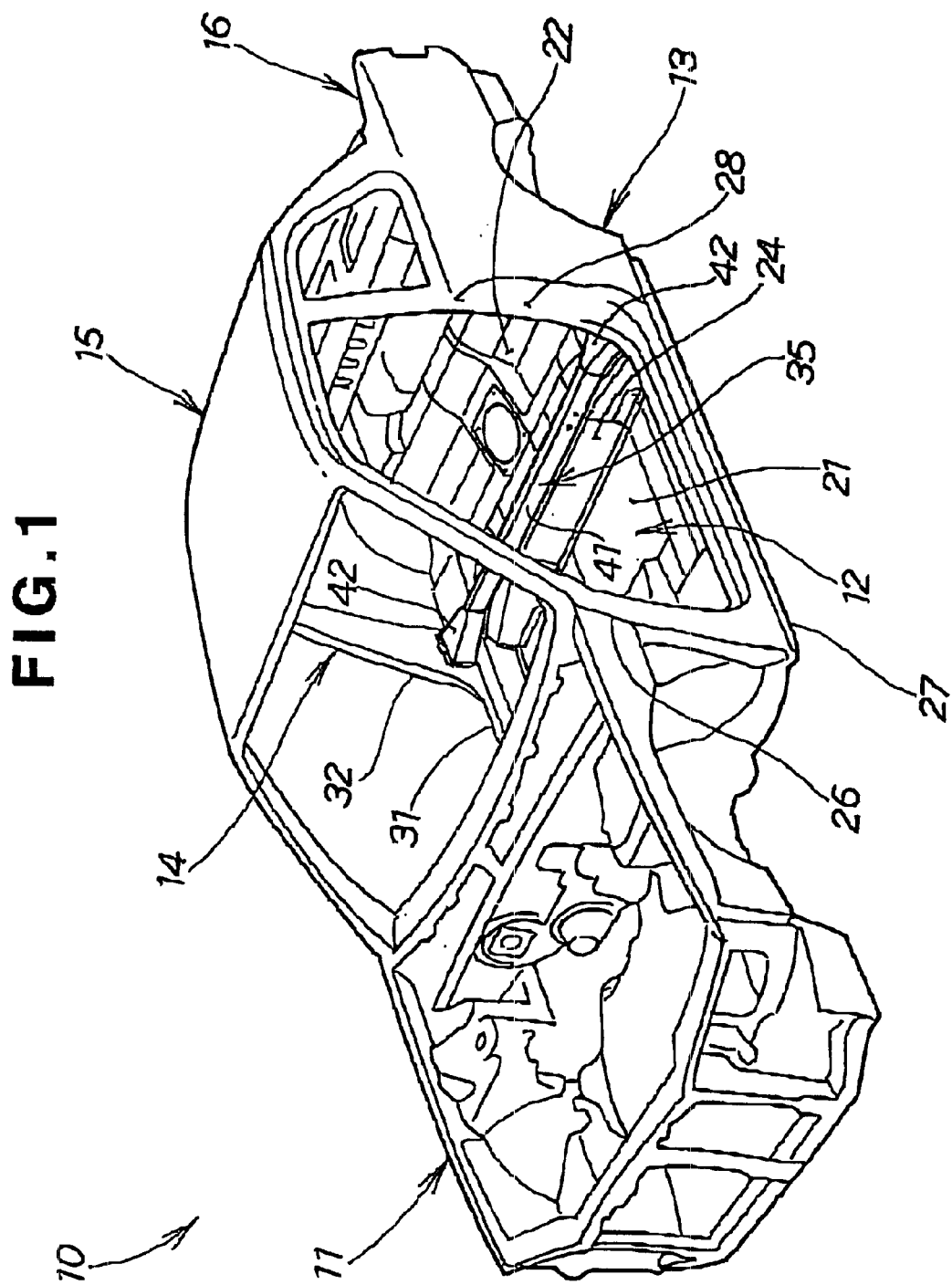
FIG. 1 is a perspective view of an automobile body having a body structure according to the present invention.
Figure 2:
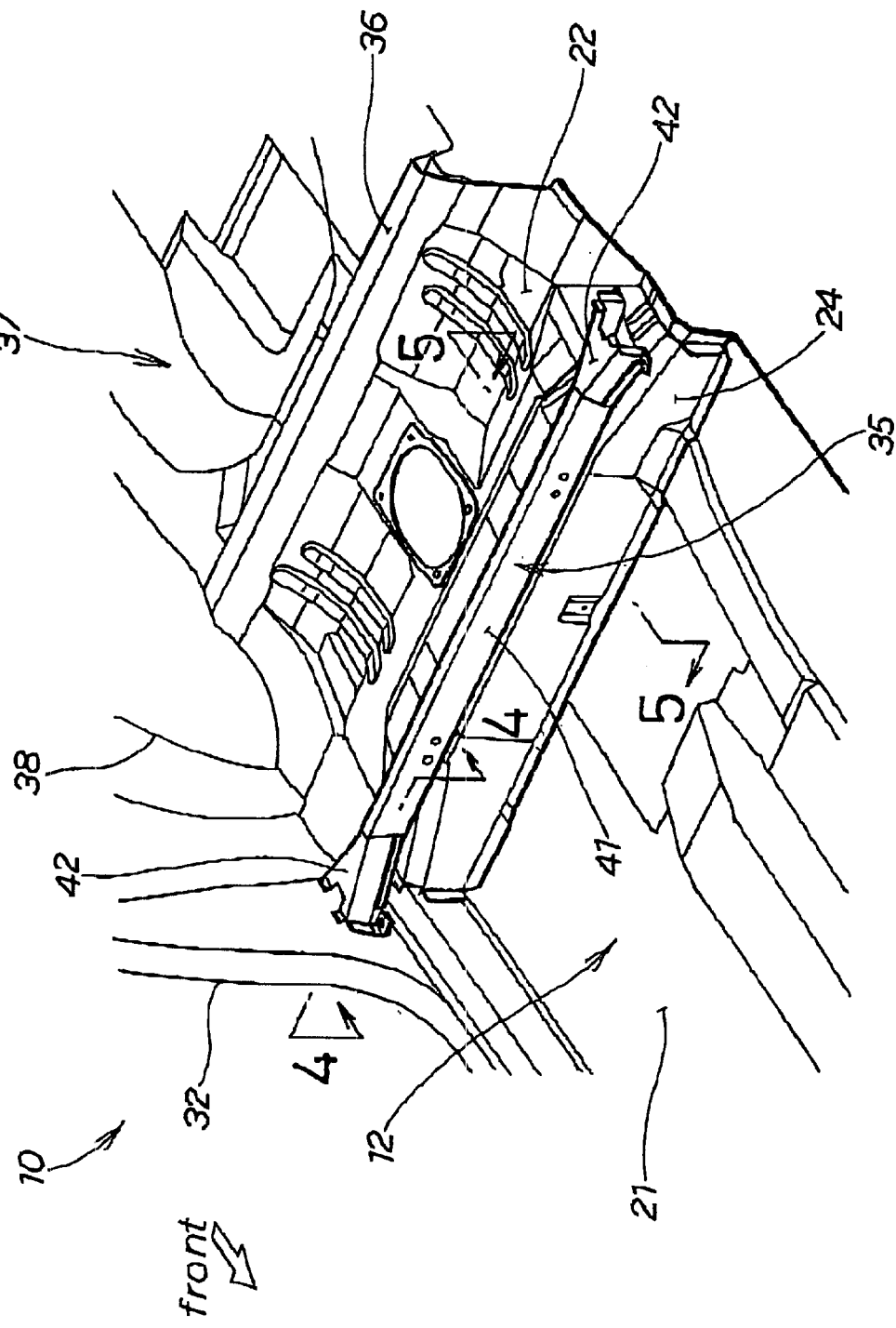
FIG. 2 is a diagram illustrating a crossbeam connecting left and right center pillars.

Referring to FIGS. 1 and 2, an automobile body 10 has a frame structure including a front body 11, under body 12, left and right side bodies 13 and 14, roof 15, and rear body 16.

The front body 11 forms an engine compartment, supporting an engine, and supports an input for a front suspension. The under body 12 forms floors of a passenger compartment and a baggage compartment at the rear of the front body 11, housing a fuel tank, spare tire and the like, and also supports an input for a rear suspension. The left and right side bodies 13 and 14 extend upward from the respective sides of the under body 12, forming the sides of the passenger compartment. The roof 15 is extended between the upper portions of the side bodies 13 and 14, forming the roof of the passenger compartment. The rear body 16 forms the baggage compartment at the rear of the under body 12.

The under body 12 consists of a front floor panel 21 constituting a practical floor panel as the floor of the passenger compartment, a rear floor panel 22 supporting rear seats and constituting the floor of the baggage compartment, a middle floor crossmember 23 (See FIG. 5) mounted in the vicinities of connected portions of the front floor panel 21 and the rear floor panel 22, and a middle floor crossmember stiffener 24 provided at the front of the middle floor crossmember 23 for reinforcing the crossmember 23.

The left side body 13 has a front pillar 26 to which a door is mounted, a left side sill 27 formed at the side of the under body 12 for increasing the rigidity of the body, and a left center pillar 28 to which parts for holding the rear end of the door and locking the door are mounted. The right side body 14 has a right side sill 31 and a right center pillar 32 similar to those of the left aide body 13.

A crossbeam 35 according to the present invention is extended along an upper front portion of the middle floor cross member stiffener 24 between the left and right center pillars 28 and 32, connecting the left and right center pillars 28 and 32. Reference numeral 36 denotes a rear floor crossmember provided on the rear floor panel 22. Reference numeral 37 denotes a depressed portion for accommodating a spare tire, formed in the rear floor panel 22 at the rear of the rear floor crossmember 36. Reference numeral 38 denotes a rear wheel house.

The crossbeam 35 is a member for transmitting an excessive load generated, for example, at the left center pillar 28 (or the right center pillar 32) by the impact of another automobile against the side of this automobile, to the right center pillar 32 (or the left center pillar 28). The excessive load is received by the right center pillar 32 (or the left center pillar 28) to prevent the deformation of the left center pillar 28 (or the right center pillar 32) on the load generated side.

FIGS. 3A and 3B illustrate the crossbeam 35 viewed from above.

In FIG. 3A, the crossbeam 35 consists of a pipe-like beam body 41 and two gussets 42, 42 mounted to the opposite ends of the beam body 41, respectively. A commercially available steel pipe, for example, can be used as the beam body 41 to reduce the cost of parts n extruded material of aluminum alloy, for example, can be used to reduce weight while securing the rigidity.

The gusset 42 is a member having a divergent shape in a plan viewed with the width increasing from the beam body 41 toward the left or right center pillar 28 or 32. The taper (cone) angle formed by side surfaces 42a and 42b of the gusset 42 is herein indicated by θ. Reference numerals 42c and 42d denote mounting parts formed at the ends of the gussets 42 to be mounted to the left and right center pillars 28 and 32. In the present invention, the gusset 42 when viewed in three dimensions may be in the shape or a frustum of a quadrangular pyramid with the top portion horizontally cut off, having a closed cross-section.

In FIG. 3B, the gussets 42 are put on the opposite ends of the beam body 41, respectively, and welded to the beam body 41, thereby to be assembled into the crossbeam 35.

FIG. 4 illustrates the crossbeam 35 mounted to the right center pillar 32. The cross beam 35 is mounted to the left center pillar 28 in a similar manner, and the mounting to the left center pillar 28 will not be described.

The right center pillar 32 consists of an outer panel 45, an inner panel 46 disposed inside the outer panel 45, a sub inner panel 47 mounted between the outer and inner panels 45 and 46, and a reinforcement 48 mounted to the sub inner panel 47, extending substantially horizontally toward the inside. An L-shaped joint member 51 is mounted to the inner panel 46. A plurality of nuts 52 is welded to the foot of the joint member 51. Reference numeral 53 denotes a seatbelt anchor bracket mounted to the inner panel 46. Reference numeral 54 denotes bolts for mounting the crossbeam 35 to the center pillar 32. Reference numeral 55 denotes a seatbelt. Reference numerals 57 and 58 denote a bolt and nut for mounting the seatbelt 55 to the seatbelt anchor bracket 53.

To connect the crossbeam 35 to the right center pillar 32, the bolts 54 are inserted into two insertion holes (not shown) provided at the and of the crossbeam 35 and screwed into the nuts 52 at the right center pillar 32.

The reinforcement 48 is a member for reinforcing the right center pillar 32 so as to smoothly transmit a transverse load produced at the right center pillar 32 to the crossbeam 35, and is provided on an extension line 59 of the crossbeam 35.

Figure 5:
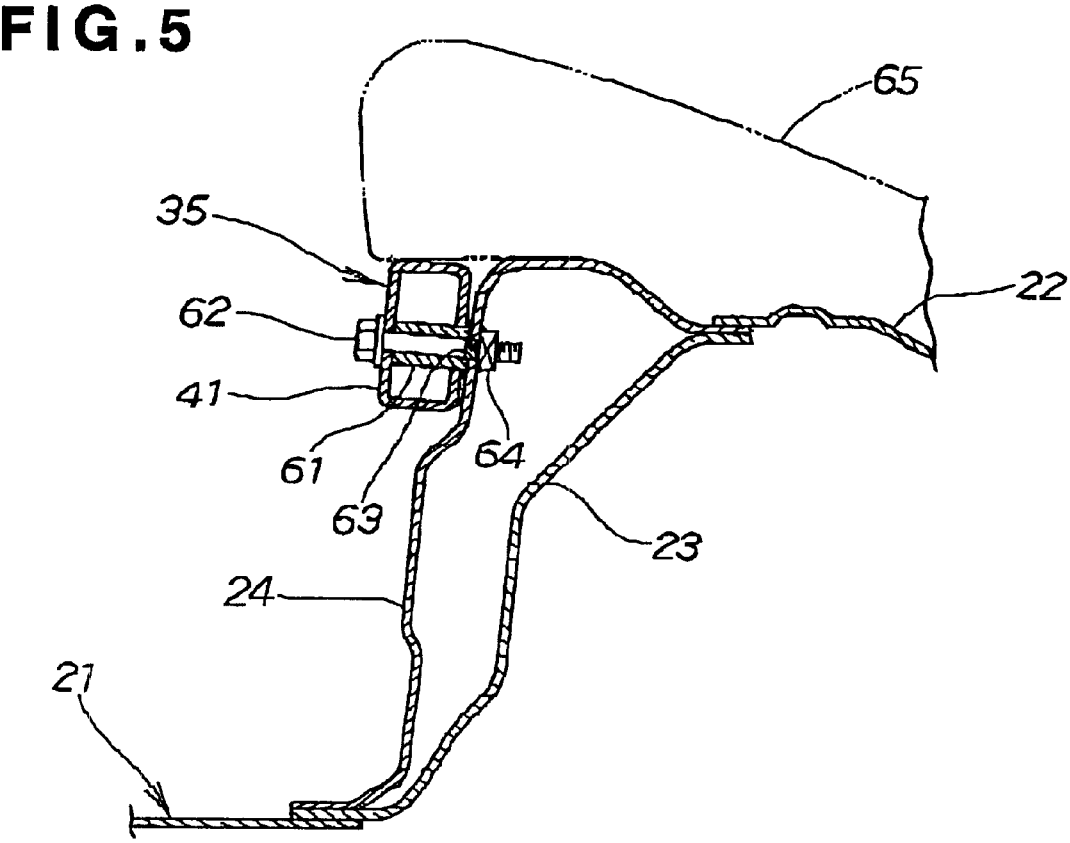
FIG. 5 is a cross-sectional view illustrating the crossbeam mounted to a crossmember consisting of a middle floor crossmember and a middle floor crossmember stiffener.

FIG. 5 illustrates the crossbeam 35 mounted to a cross member.

The crossmember consists of the middle floor crossmember 23 and the middle floor crossmember stiffener 24, forming a structure with closed cross-section. One end of each of the middle floor crossmember 23 and the middle floor crossmember stiffener 24 is mounted to the rear end of the front floor panel 21, and the other end is mounted to the front end of the rear floor panel 22.

The crossbeam 35 has a plurality of collars 61 provided inside the pipe-like beam body 41. Bolts 62 are inserted through the respective collars 61. The bolts 62 are inserted through mounting holes 63 formed in the middle floor crossmember stiffener 24. A plurality of nuts 64 is fixed by welding to the inside of the middle floor crossmember stiffener 24, corresponding to the mounting holes 63. The bolts 62 are screwed into the respective nuts 64 so as to mount the crossbeam 35 to the middle floor crossmember stiffener 24. Reference numeral 65 denotes a bolster in a rear seat.

As described above, the automobile body structure of the present invention has the crossbeam 35 for connecting the left and right center pillars 28 and 32 shown in FIG. 1, fixed to the crossmember consisting of the middle floor crossmember 23 and the middle floor crossmember stiffener 24. The crossmember itself is not directly connected to the left and right center pillars 28 and 32. Thus, when an impact load is applied to one of the center pillars, the load is transmitted to the other center pillar directly through the crossbeam 35. The impact load is thus dispersed into the other center pillar, resulting in the prevention of deformation of the center pillar having received the impact. In contrast, the conventional automobile body structure has only the plate-like reinforcing member fixed to the crossmember, having the possibility of deformation of the crossmember when a great load is applied to the crossmember, and thereby preventing secured transmission of an impact load to the other center pillar. Thus, the center pillar having received an impact is not prevented from being deformed.

Figure 6:
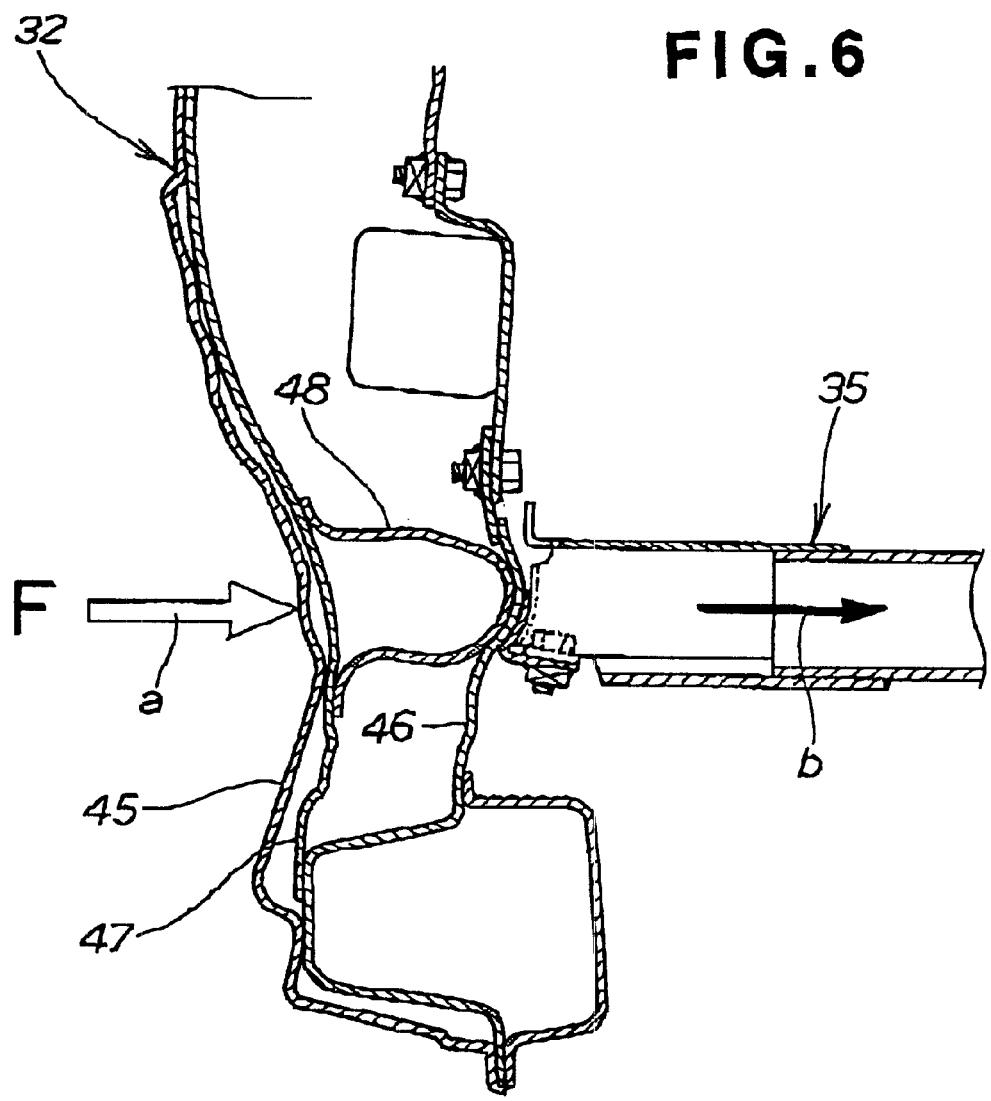
FIG. 6 corresponds to FIG. 4, illustrating the transmission of a load applied to the right center pillar to the crossbeam.

The function of the automobile body structure in this invention as described above will be described with reference to FIGS. 6 and 7.

When another automobile strikes against the side of the automobile and an excessive load "F" is inputted to the right center pillar 32 in the direction of arrow "a," the outer panel 45 and the sub inner panel 47 are crushed by the load F, and the reinforcement 48 strikes the inner panel 46. The load is smoothly transmitted from the inner panel 46 to the crossbeam 35 as shown by arrow "b." The load is thus also received by the left center pillar 28 shown in FIG. 1 to reduce the deformation of the right center pillar 32.

Figure 7:
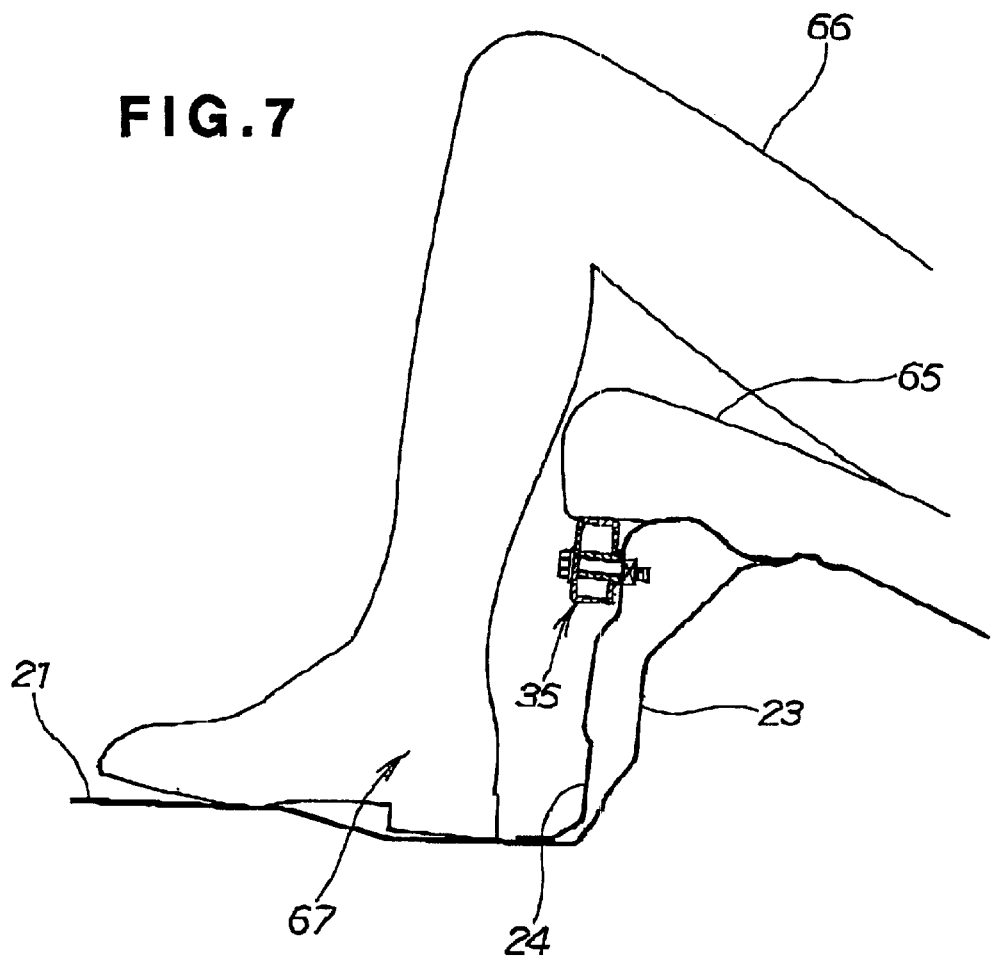
FIG. 7 is a diagram illustrating the crossbeam arranged in a space below a front portion of a bolster in a rear seat.
Figure 8:
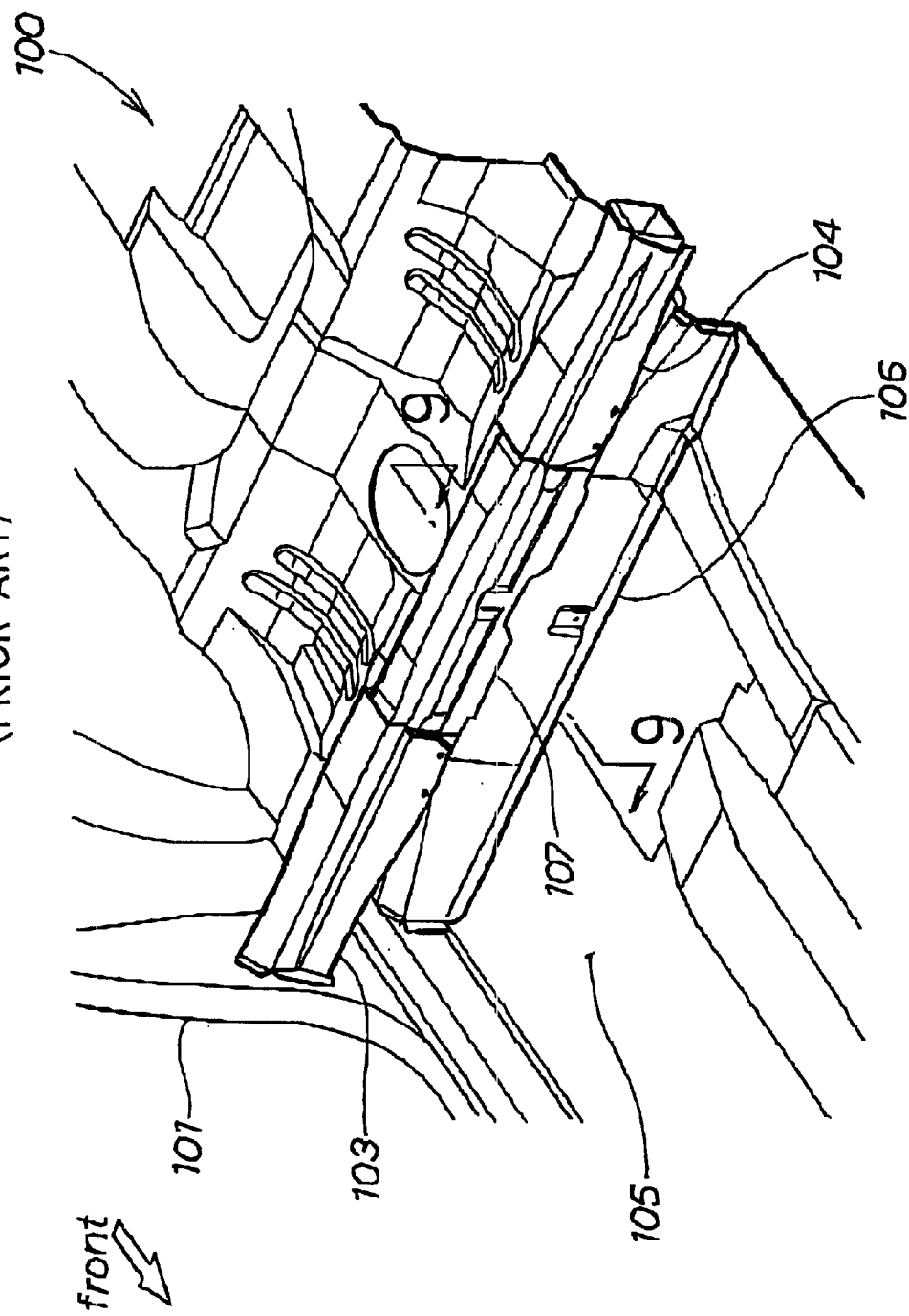
FIG. 8 is a perspective view of an automobile body having a conventional body structure.
Figure 9:
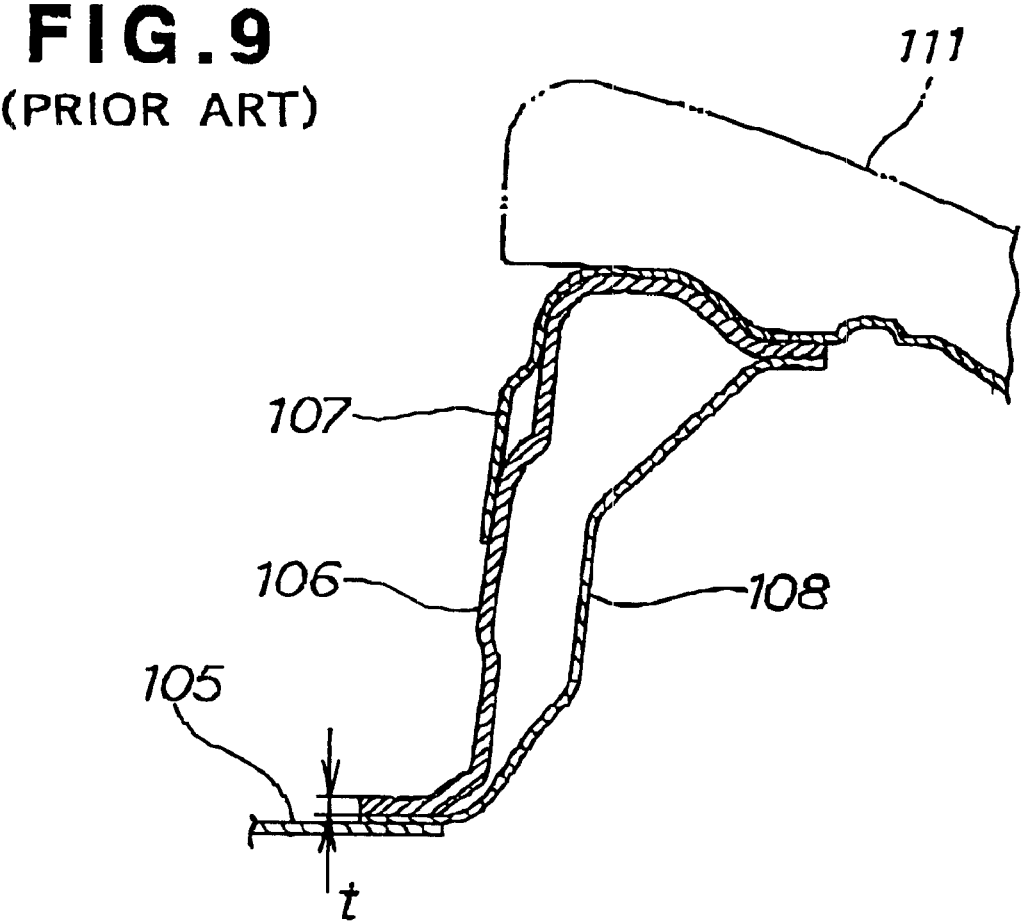
FIG. 9 is an enlarged cross-sectional view taken along line 9—9 in FIG. 8.

The crossbeam 35 of the present invention is disposed at the front upper portion of the middle floor crossmember stiffener 24, that is, in a space below a front portion of the bolster 65 in the rear seat as show in FIG. 7 without obstructing a foot 67 of a passenger 66 seated in the rear seat, resulting in an effective use of space.

As described above, the present invention allows an input load inputted to the center pillar 28 (or the center pillar 32) at a side collision with another automobile to be received at the center pillar 32 (or the center pillar 28) via the crossbeam 35. This for example prevents the middle floor crossmember stiffener 24 from directly receiving the input load, eliminating the need for the reinforcement of the middle floor crossmember stiffener 24 Thus, no forming die for a reinforcement for the middle floor crossmember stiffener 24 is used, resulting in the reduction of die cost and the reduction in manufacturing cost of the automobile body 10. Further, it is not necessary to increase the thickness of the middle floor crossmember stiffener 24 or to add a reinforcing member, resulting in the reduction in weight of the automobile body 10.

Further, the present invention has the gussets 42 having a shape diverging in the directions of the center pillars 28 and 32, increasing the areas of the load receiving surfaces of the gussets 42 to receive load from the right and left center pillars 28 and 32 so as to reliably transmit input load to the left and right center pillars 28 and 32 to the crossbeam 35. Thus, a load inputted to the center pillar 28 (or the center pillar 32) is securely received by the center pillar 32 (or the center pillar 28), leading to the prevention of the deformation of the center pillar 28 (or the center pillar 32) having received the impact. More specifically, an input load at a side collision is smoothly transmitted from the outer panel 45 of the center pillar 28 (or the center pillar 32), through the reinforcement 48, inner panel 46, and crossbeam 35, to the center pillar 32 (or the center pillar 28). This prevents the center pillar 28 (or the center pillar 32) having received the impact from being greatly deformed.

The beam body 41 of the crossbeam 35 in the present invention is fixed to the middle floor crossmember stiffener 24 constituting pert of the crossmember as shown in FIG. 5. This prevents the bending or buckling of the beam body 41 due to an input load to the crossbeam 35. The increased mounting portions of the crossbeam 35 to the automobile body 10 increases the rigidity of the body.

The present embodiment in which the crossbeam consists of three members, one beam body and two gussets, is not intended to limit the present invention thereto. The beam body and the two gussets may be formed integrally and divided at the center of the beam body to constitute two left and right members which are connected together to form the crossbeam. Alternatively, the beam body and the two gussets may be formed integrally and longitudinally divided into two parts forming the crossbeam, which are fastened together to the middle floor crossmember stiffener. Alternatively, the beam body and the two gussets may be formed integrally to be a single member constituting the crossbeam.

The present disclosure relates to the subject matter of Japanese Patent Application No. 2001-169734, filed Jun. 6, 2001, closure of which is incorporated herein by reference in its entirety.

What is claimed is:

1. An automobile body structure, comprising:

a left center pillar;

a right center pillar; and a crossbeam interposed between and connected to said left and right center pillars, said crossbeam comprising a beam body and gussets mounted to the opposite ends of said beam body, respectively, each of said gussets having a divergent shape with width increasing from said beam body toward said center pillar.

2. An automobile body structure as set forth in claim 1, wherein each of said center pillars has a structure with a hollow cross-section comprising an outer panel and an inner panel, and a reinforcing member for reinforcing said center pillar is interposed between said outer and inner panels and positioned on an extension line of said crossbeam so as to smoothly transmit a transverse load inputted to said center pillar to said crossbeam.

3. An automobile body structure as set forth in claim 1, wherein a crossmember is provided an a floor panel of said automobile body, extending between said left and right center pillars, and said beam body is fixed to said crossmember.

* * * * *